(12) United States Patent
Stein

(10) Patent No.: US 8,720,966 B2
(45) Date of Patent: May 13, 2014

(54) INJECTION MOLDED COVER ELEMENT WITH UNINTERRUPTED HOLE PATTERN

(75) Inventor: Joerg Stein, Bonn (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/495,103

(22) Filed: Jun. 13, 2012

(65) Prior Publication Data

US 2013/0001971 A1 Jan. 3, 2013

(30) Foreign Application Priority Data

Jun. 28, 2011 (DE) .............................. 102011078234

(51) Int. Cl.
*B60R 13/02* (2006.01)

(52) U.S. Cl.
USPC ..................................................... 296/1.08

(58) Field of Classification Search
CPC .... B60R 11/0217; B60R 13/02; B60R 1/023; B60R 13/0243; B60R 2013/0287; B60R 21/21; B60R 22/24; B60R 7/046; B60R 1/04; B60R 5/00; B60R 2021/23324; B60R 21/239; B32B 2605/003; B32B 2605/08; B32B 3/12; B60J 5/0469; B60J 5/101; B60Q 1/323; B60Q 3/0233; B60Q 3/0203; E06B 7/30; H01L 2224/14131; H01L 23/49816; B29C 43/00; B29C 33/42; B29C 45/006; B29C 49/06; B62D 65/14
USPC .......... 296/1.08, 146.7, 146.5, 150, 153, 191; 49/502, 146.7, 348, 349, 350, 351
See application file for complete search history.

(56) References Cited

U.S. PATENT DOCUMENTS

| | | | | |
|---|---|---|---|---|
| 4,032,725 | A * | 6/1977 | McGee | 381/395 |
| 6,660,201 | B1 * | 12/2003 | van Manen | 264/156 |
| 6,977,110 | B2 * | 12/2005 | Funakoshi | 428/138 |
| 7,280,665 | B2 | 10/2007 | Tamura et al. | |
| 7,793,972 | B2 * | 9/2010 | Downey | 280/728.3 |
| 2003/0025045 | A1 * | 2/2003 | Hinokio | 248/27.1 |
| 2006/0060415 | A1 * | 3/2006 | Radu et al. | 181/150 |
| 2006/0151910 | A1 * | 7/2006 | Schoemann et al. | 264/250 |
| 2008/0150324 | A1 * | 6/2008 | Jayasuriya et al. | 296/187.12 |
| 2009/0206630 | A1 * | 8/2009 | Cavallin et al. | 296/146.7 |
| 2010/0225142 | A1 * | 9/2010 | Mazur et al. | 296/146.7 |

* cited by examiner

*Primary Examiner* — Glenn Dayoan
*Assistant Examiner* — Sunsurraye Westbrook
(74) *Attorney, Agent, or Firm* — Vichit Chea; MacMillan, Sobanski & Todd, LLC

(57) ABSTRACT

A plastic molded trim panel for a vehicle provides a cover element formed as an injection-molded panel with a visible side and an underside. The cover element has a smooth outer rim region, a patterned central region, and an edge region between them. The patterned central region includes a first plurality of regularly-spaced holes disposed in the visible side with a predetermined pattern and having a first substantially uniform depth. The edge region includes a second plurality of regularly-spaced holes disposed in the visible side uniformly continuing the predetermined pattern and having a generally decreasing depth according to proximity to the rim region. The rim region is smooth on the visible side without holes. The decreasing depth of the holes allows an uninterrupted hole pattern to be used because the truncated holes at the edge of the pattern remain to be manufacturable using injection molding.

7 Claims, 4 Drawing Sheets

INJECTION MOLDED COVER ELEMENT WITH UNINTERRUPTED HOLE PATTERN

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to a cover element having through-holes and blind holes as well as a hole-free rim, wherein the cover element is produced from a plastics material by injection molding.

Cover elements or grille elements of this type are known in the automotive industry and, for example, can cover recesses or openings in vehicle doors, in the dashboard, or in other motor vehicle elements. For example, air ventilation outlets or loudspeakers can be covered. When creating grille structures having geometrical hole patterns, if the cover edges are trimmed or shaped in a manner deviating from the geometrical arrangement, there occur regions of different sizes in which truncated holes would be created having a size that is below what can be obtained by the production process. Consequently, the truncated holes are dropped from the pattern and an imperfect edge pattern is thus formed.

In the case of covering loudspeakers, the grille element is subject to specific requirements in terms of the acoustics of the loudspeaker. In this case, the grille elements are referred to as loudspeaker grilles. The desired acoustic performance dictates a total area and layout of open holes through which sound and air can pass. When producing loudspeaker grilles as an integrated component, the grille hole pattern may continue into a rim or edge region of the cover element using blind holes which do not penetrate through the grille element. A more pleasing appearance is provided by the continuation of a uniform hole pattern across a greater portion of the grille. At the edge of the pattern, however, the holes are subject to limits imposed by the production process. It is typically not possible to produce a truncated hole with a hole size less than half the diameter of a hole. A frayed, imperfect, undesired appearance is produced by the omission of this grille pattern in this edge region.

In order to overcome this visual problem, the hole pattern could be changed toward the edge region so that holes that are as complete as possible (i.e., holes that are unchanged in terms of their geometry) are produced. This is generally achieved by changing the distance between the holes or by scaling the hole size. Interrupted patterns, which at best are considered to be less objectionable than imperfect outer contours, are produced by this interference with the uniformity of the grille arrangement. The creation of such geometries involves great effort and may take up to four days or more for a designer to develop, depending on the design and grille size, if each hole has to be created individually. In addition, it is necessary to repeat this effort for each new grille element being developed for different products (e.g., models of vehicles).

For a speaker grille, all of these additional efforts to develop modified hole patterns may have an undesirable affect on the acoustic properties. The ideal acoustic property of a loudspeaker grille would allow an air flow of 50%. Depending on the component, different materials are used in production by injection molding. The specific material properties influence the necessary dimensions of the webs as a result of their specific fluidities. The size of the hole diameters thus depends on the acoustic parameters and may be minimized by the necessary web width. The greatest air flow is achieved with offset holes. One ideal shape is hexagonal holes similar to a honeycomb. This geometry does not allow any change or adjustment of the holes by different sizes and distances.

Based on the foregoing, an object of the present invention is to provide a grille element which can be designed and produced quickly and as easily and advantageously as possible by simple means, it being possible at the same time to achieve an uninterrupted hole pattern.

SUMMARY OF THE INVENTION

This and other objects are achieved by a cover element having the features of claim 1. Further, particularly advantageous embodiments of the invention are disclosed in the dependent claims.

It should be noted that the features stated individually in the claims can be combined in any technically feasible manner and demonstrate further embodiments of the invention. The description additionally characterizes and details the invention, in particular in conjunction with the figures.

The invention proposes a cover element or a grille element which has through-holes in a central region, a hole-free outer rim region, and blind holes in an edge region between the central region and the rim region. The cover element is produced from a plastics material by injection molding. The blind holes having a depth generally decreasing toward the rim.

The invention is based on the knowledge that the blind holes are arranged toward the edge in an edge region located between the active central region and the hole-free rim itself. For the purposes of the invention, the blind holes are merely one-sided. Specifically, the blind holes are open toward the visible side of the grille element. According to the invention, the edge region may have two subregions, one of which can be referred to as the inter-edge subregion which adjoins the active central region. This inter-edge subregion is adjoined by an end edge subregion, which adjoins the hole-free rim region.

The end edge subregion has a specified radial extent from the hole-free rim to the inter-edge region, said extent being specifiable according to hole parameters such as hole diameter and the distance between holes. The radial extent can be defined according to the following equation $$A = 4*r + 1.5*d \qquad \text{(equation 1).}$$

where A is the radial extent, r is the hole radius, and d is the distance from hole center to hole center of adjacent holes.

Depending on the hole diameter and the specified distance from hole center to hole center, the end region thus has a respectively adapted or variable minimal extent. Blind holes of variable depth may also be arranged in the inter-edge region. It is expedient to determine the extent of the end edge region in which the blind holes are adapted in any case, in order to be able to achieve the uninterrupted hole pattern. With decreasing depth of the produced blind holes, that is to say accordingly with decreasing height of the negative pins of the negative injection mold, these pins can be produced in the end edge region with the diameter of the through-holes, in particular circle-segment-shaped blind holes or corresponding negative pins, which appear visually to have the same diameter, also being possible. A largely uninterrupted hole pattern is thus achieved overall.

The hole parameters are, of course, dependent on the application of the cover element, hole parameters being specified preferably with regard to the through-holes penetrating the cover element since these determine the hole pattern. For example, if the cover element of the invention is a loudspeaker grille, the diameters of the through-holes in the active region are thus specified by acoustics professionals, who determine the necessary air flow for the loudspeaker covered by the cover element. In addition, the acoustics professionals may specify the distance between hole centers. Of course, the distance between hole edges may also be used instead of the distance between hole centers. A hole pattern corresponding to the acoustics is thus specified in the active region.

It is thus possible with the invention to produce and develop a cover element with specified air flow, said cover element having hole patterns in particular in the edge region, that is to say both in the inter-edge subregion and in the end edge subregion, that are uninterrupted compared to the active region.

In the end edge subregion, the blind holes advantageously have a preferably continuously decreasing depth toward the hole-free rim region. The base or bottom surface of the blind holes may follow a nonplanar surface, for example an inclined bottom surface of the blind hole base.

In an advantageous embodiment, the blind holes have in the end edge region have a depth that follows the course of the underside of the cover element opposite the visible face. If in the end edge region the underside were therefore to rise in a slightly inclined manner toward the hole-free rim, the blind hole base would be adapted and inclined with the same orientation. The light reflection by the blind hole in question is thus also influenced. In particular, it is possible for the blind holes to be designed not only as holes having a complete circumference, but also to be designed as hole portions or in a circle-segment-like manner, viewed from above, as already discussed before. Such an embodiment can be achieved in particular in the direct vicinity of the hole-free rim, and additionally conveys the impression of a continuously uninterrupted hole pattern.

With the invention, the depth of the blind holes in the edge region, in particular in the end edge region of the cover element, or of the exemplary loudspeaker grille, is advantageously reduced slowly and uniformly, following the outer contour, so that the blind holes fade out toward the hole-free rim and any missing, small segments truncated from individual holes are no longer perceived. Since the geometric order of the hole pattern is not changed, it is possible to use this solution for all imaginable hole patterns. The creative freedom to integrate the loudspeaker according to the design of the surrounding environment is fully retained. The cover element, that is to say in the exemplary embodiment, the loudspeaker grille functions faultlessly, thus improving appearance and therefore processing quality.

It is expedient if the cover element can be formed with all imaginable hole patterns, the cover element possibly having round or angular, preferably hexagonal, holes, for example in the form of a honeycomb, it being possible to continue the hole pattern uninterruptedly as far as the hole-free rim. In particular, the cover element is suitable for covering all possible openings, and is not limited to the exemplary embodiment in the form of a loudspeaker grille. It is essential that the cover element is manufactured from a plastics material as an injection molded part. The advantage that the negative molds for producing the cover element according to the invention can have pins (these form the blind holes in the form produced) in the end edge region is evident, these pins being maintained and not being destroyed during the injection molding process, in spite of the small diameter, on account of the reduced depth of the finished blind hole.

For the purposes of the invention, a hole-free rim means that fastening holes may of course be provided, these fastening holes also possibly being covered at least toward the visible side. A hole-free rim should therefore be understood to mean that it does not have a hole pattern. Nevertheless, such an embodiment which does not have a hole-free rim, in which the hole pattern is thus taken as far as the end edge, is also to be included by the invention.

BRIEF DESCRIPTION OF THE DRAWINGS

Further advantageous details of the invention are explained in greater detail in the dependent claims and hereinafter on the basis of an exemplary embodiment illustrated in the figures, in which:

DETAILED DESCRIPTION OF PREFERRED EMBODIMENTS

In the different figures, like parts are always denoted by like reference signs and are therefore generally also only described once.

Figure 1:
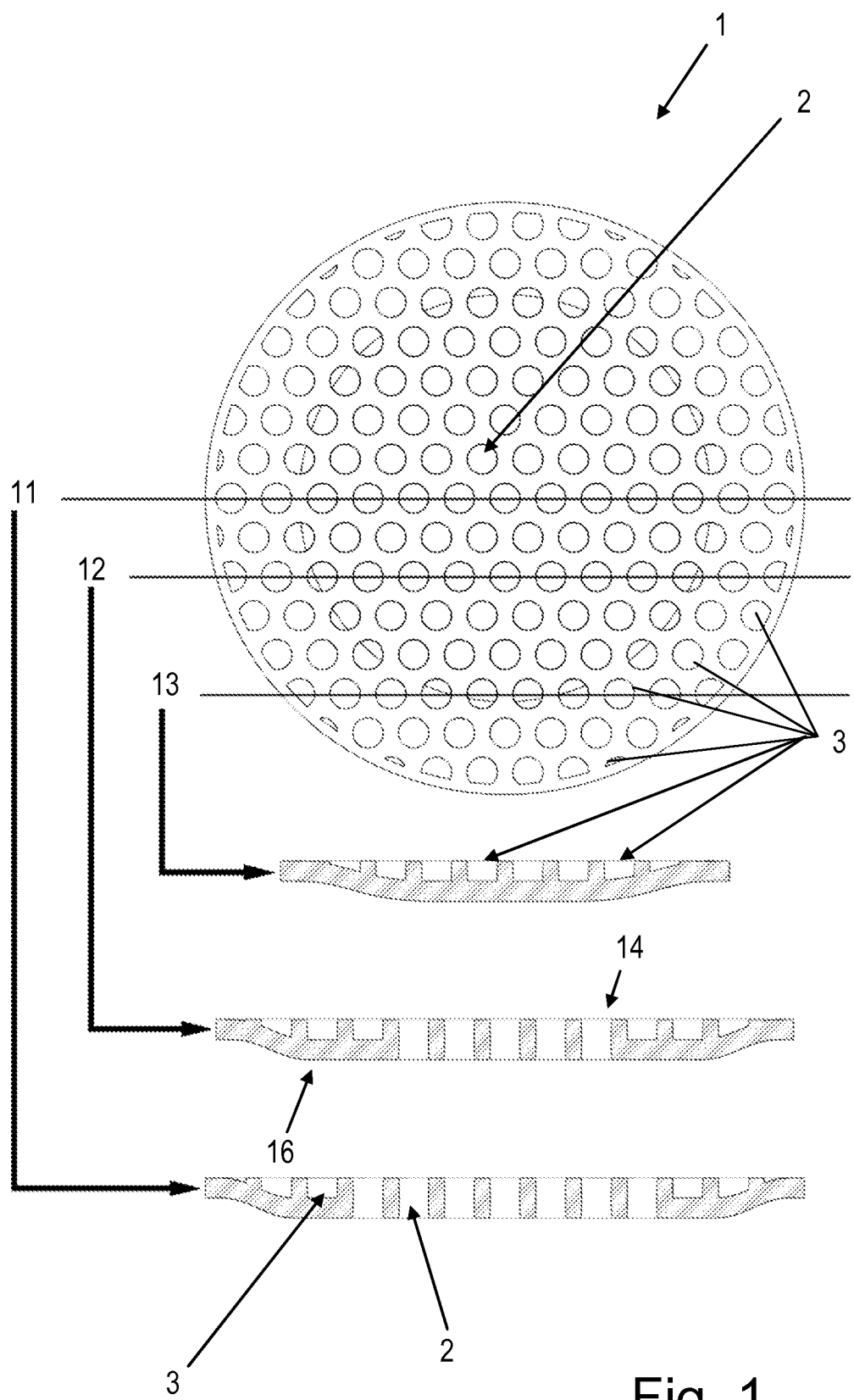
FIG. 1 shows a plan view of a cover element in the merely exemplary embodiment of a loudspeaker grille, as well as cross-sections through the cover element.

FIG. 1 shows a cover element 1 or a grille element 1, which has through-holes 2 and blind holes 3 as well as a hole-free rim 4 (FIGS. 3 and 4), the cover element 1 being produced from a plastics material by injection molding. The blind holes 3 occupy an edge region 8 which may include an end edge subregion 6 (FIG. 2) wherein the depth of blind holes 3 is generally decreasing in proportion to the proximity of holes 3 to rim 4.

In the exemplary embodiment illustrated in FIG. 1, the cover element 1 is designed by way of example as a loudspeaker grille 1. The cover element 1 has an acoustically active zone 7 (with through holes 2) and an acoustically passive zone 8 (with blind holes 3).

The acoustically passive zone 8 can thus also be referred to as an edge region 8, which has two subregions: an inter-edge region 9 and the end edge region 6. The blind holes 3 in inter-edge region 9 may preferably have a uniform depth.

In the three cross-sections depicted merely by way of example in FIG. 1, the active zone 7 and the passive zone 8 can each be seen in detail. A first section 11 runs through the cover element 1, almost cutting the circle in half. A second section 12 runs in the manner of a secant, with a third section 13 also running in the manner of a secant. In contrast to the second section 12 which also intersects part of the active zone 7, the third section runs completely through the passive zone 8, or through the edge region 8 with its two portions 6 and 9.

As can be seen in FIG. 1, the cover element 1 has a visible side 14 and an opposed underside 16. The through-holes 2 are open both toward the visible side 14 and toward the underside 16. The blind holes 3 are only one-sided, more specifically they are open toward the visible side 14, and each has a base 17. By way of example, the base 17 of the blind holes 3 arranged in the inter-edge region 9 runs level. The underside 16 also runs largely level in this region 9. By contrast, the underside 16 in the end edge region 6 runs slightly conically upward. The base 17 of the blind hole 3 in question in the end edge region 6 is advantageously designed so as to correspond to the course of the underside 16. Any blind hole 3 arranged in the end edge region can thus be arranged, over the entire course of the blind hole base 17, at the same distance from the underside 16 of the cover element 1 as the blind holes 3 in the inter-edge region 9. In other words, the thickness of the underside 16 is thus kept uniform or unchanged at each blind hole 3 in the end edge region 6, but also in the inter-edge region 9. This also means, however, that the blind hole 3 in question may itself have a non-uniform depth as viewed in cross-section, as can be inferred by way of example from FIGS. 1 and 2.

The dimensions of the through-holes 2 are specified with regard to their diameter D (or equivalently their radius r) and with regard to the respective distance d from their center points. In the case of the exemplary loudspeaker grille 1, these specifications are based on corresponding requirements of acoustics professionals, who respectively stipulate the best sound conditions of the loudspeaker, that is to say the necessary air flow through the loudspeaker grille 1. For example, a specific hole pattern is thus specified in the active zone 7. Through-holes 2 of round cross-section, which are to have a specific distance between centers d, are specified in the figures by way of example. Of course, the through-holes could also have other basic geometric forms, a hexagonal embodiment in the manner of a honeycomb also being conceivable.

With the invention, it is possible for hole patterns specified in the active zone 7 to continue into the edge region 8, in particular into the end edge region 6 as far as the hole-free rim 4, so that an uninterrupted hole pattern is provided over the entire form of the cover element 1, the form of the cover element being variable of course, and not only with regard to different applications.

Figure 2:
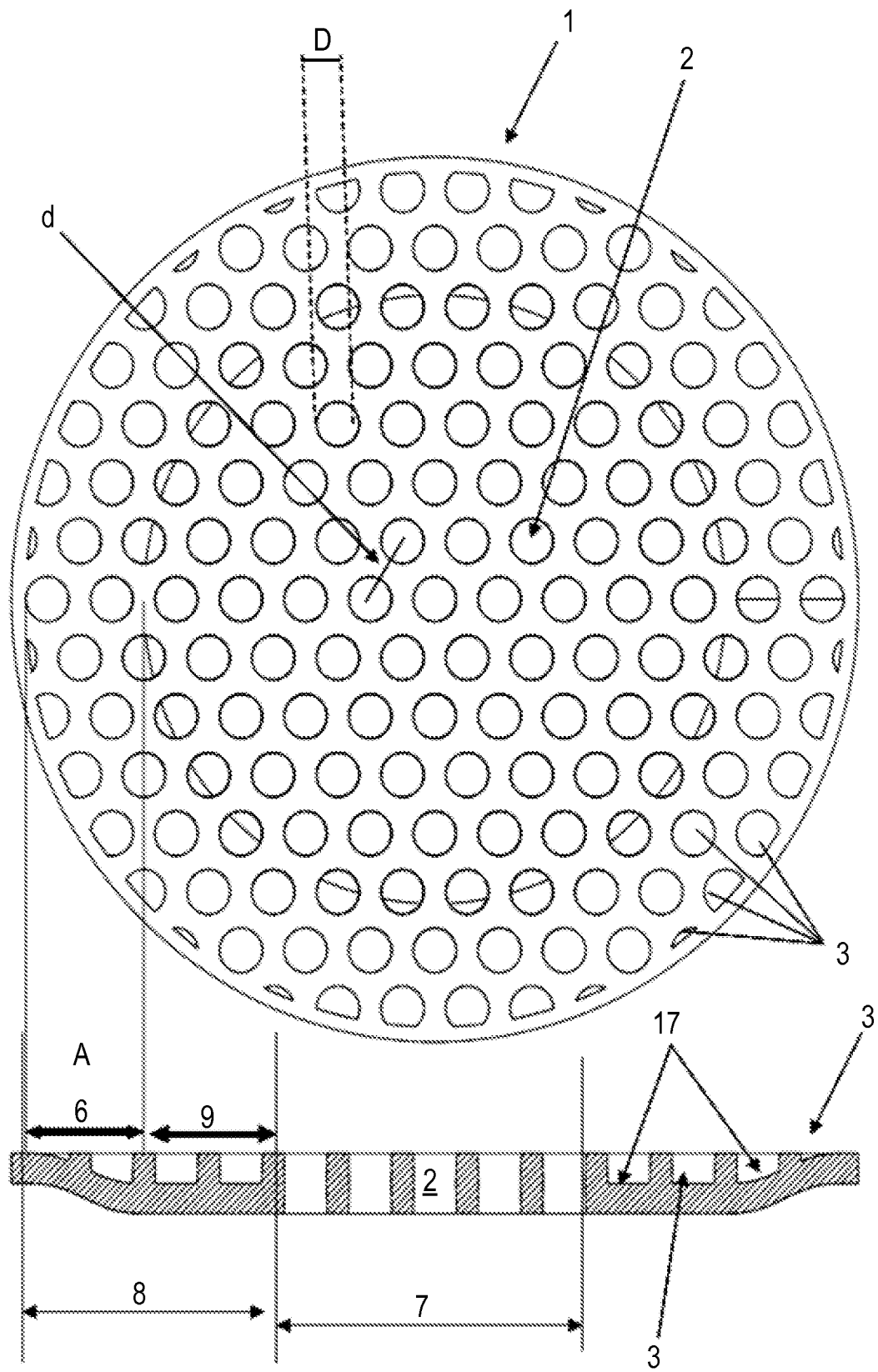
FIG. 2 shows an enlarged illustration from FIG. 1.

In the case of the invention, it is expedient if the extent of the end edge region 6 can be ascertained using the data of the specified hole pattern in the active zone 7 with regard to the diameter and the distance between centers d, with the aid of equation 1 as follows:

$$A = 4*r + 1.5*d \quad \text{(equation 1)}.$$

where A is the radial extent, r is the hole radius (i.e, one-half of diameter D), and d is the distance from hole center to hole center of adjacent holes. This is illustrated in FIG. 2 in an enlarged manner compared to FIG. 1 on the basis of the first section 12.

In other words, it is possible with the invention, on the basis of the hole pattern specified by acoustics professionals, to determine the end edge region 6 in which the blind holes 3 are adapted in terms of their depth to the possibly rising course of the underside 16. In addition, it is possible with the invention to arrange circle-segment-like blind holes 3 in the end edge region 6. The rising course of underside 16 may follow any desired profile, and blind holes 3 may preferably have a bottom surface profile that matches the underside profile at corresponding places.

Whether or not a rising course of underside 16 is present, the present invention employs a generally decreasing depth of blind holes 3 according to proximity to the hole-free rim region 4 so that truncation of any blind holes where the end of the hole pattern is reached are still able to be manufactured using injection molding methods.

Figure 3A:
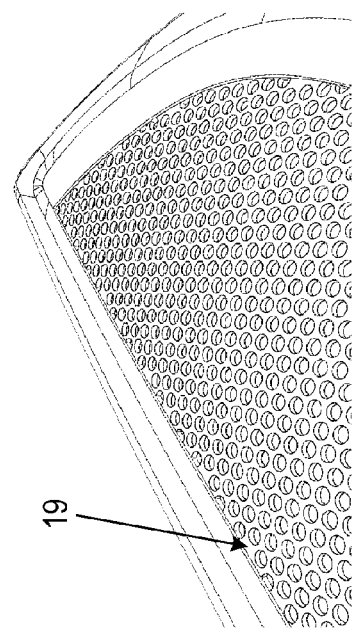
FIG. 3 shows detailed views of a loudspeaker grille compared to the prior art.
Figure 3C:
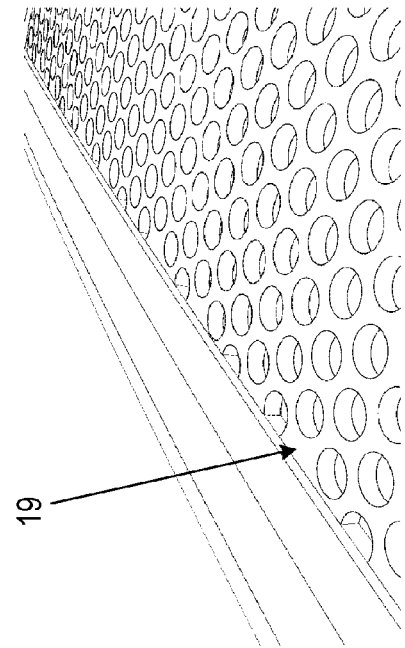
Figure 3B:
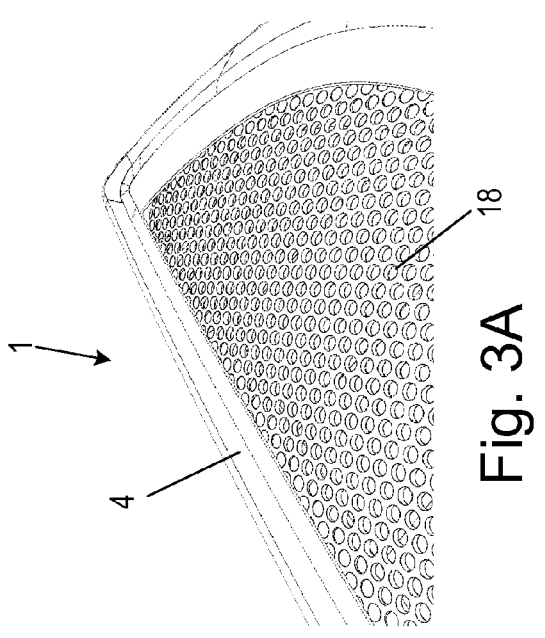
Figure 3D:
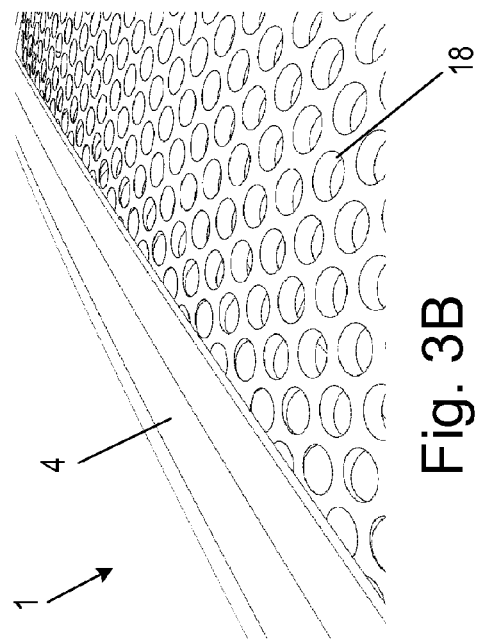

In FIGS. 3A and 3B, a cover element 1 viewed from above is illustrated on the left-hand side of the page, top and bottom, compared to a conventional cover element in FIGS. 3C and 3D. It can be seen that the cover element 1 according to the invention (3A and 3B) has an uninterrupted, uniform hole pattern 18 all the way to the pattern edge where hole-free rim 4 begins. By contrast, the conventional cover element in FIGS. 3C and 3D has an interrupted hole pattern in the edge region because the required truncated blind holes become unproducible at the conventional depth, which can be seen in the region denoted by reference sign 19.

Figure 4A:
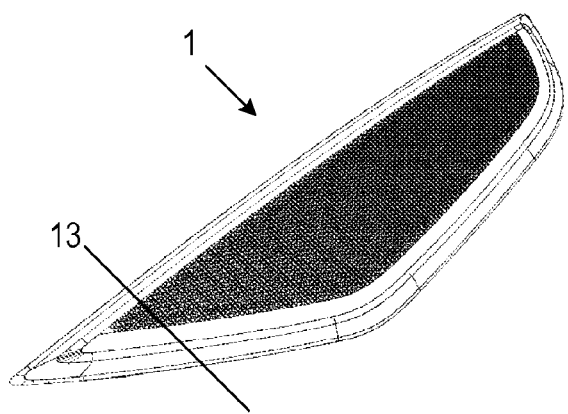
FIG. 4 shows exemplary sectional illustrations of a loudspeaker grille shown in plan view compared to the prior art.
Figure 4B:
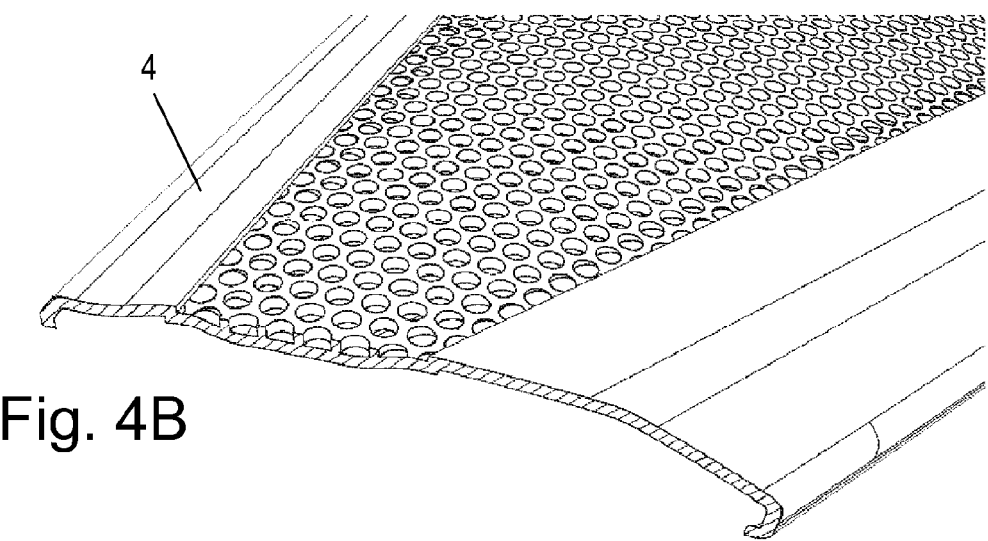
Figure 4C:
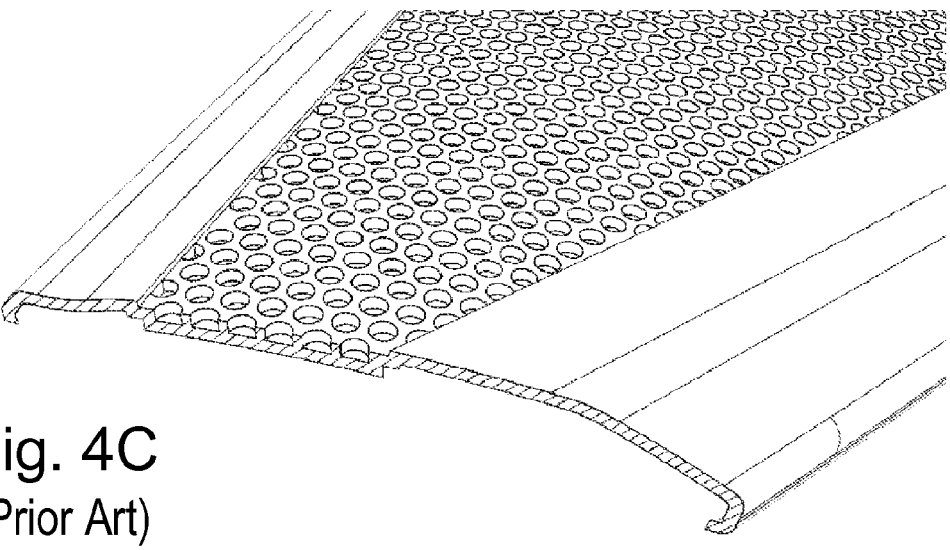

In FIG. 4A, a cover element 1 according to the invention defines a cross section location 13. FIG. 4B illustrates the cross section of cover element 1 of the invention at location 13, while FIG. 4C illustrates a corresponding cross section of a prior art cover element at the same location. Both cover elements employ the same underlying hole pattern.

In the cover element 1 according to the invention in FIG. 4B, the blind holes 3 arranged in the end edge region 6 having different depths can be seen. In the conventional cover element of FIG. 4C, all blind holes instead have an identical depth throughout, leading to an interrupted hole pattern.

What is claimed is:

1. A plastic molded trim panel for a vehicle comprising:
a cover element formed as an injection-molded panel with a visible side and an underside, the cover element having a smooth outer rim region, a patterned central region, and an edge region between the central region and the rim region;
wherein the patterned central region includes a first plurality of regularly-spaced holes disposed in the visible side with a predetermined pattern and having a first substantially uniform depth;
wherein the edge region includes a second plurality of regularly-spaced holes disposed in the visible side uniformly continuing the predetermined pattern and each having a respective depth less than the first depth and that is generally decreasing according to proximity to the rim region; and
wherein the rim region is smooth on the visible side without holes.

2. The panel of claim 1 wherein the uniform depth of the first plurality of regularly-spaced holes penetrates between the cover element.

3. The panel of claim 1 wherein the second plurality of regularly-spaced holes are blind holes that do not penetrate the underside.

4. The panel of claim 3 wherein the underside has an underside surface profile, and wherein the blind holes have a bottom surface profile matching the underside surface profile.

5. The panel of claim 1 wherein the regularly-spaced holes each has a radius r, wherein the centers of adjacent holes are spaced at a distance d, and wherein the radial extent of the edge region is defined by the equation:

$$A = 4*r + 1.5*d.$$

6. The panel of claim 1 wherein the cover element is a grille for a loudspeaker.

7. A speaker grille for a vehicle, comprising:
a molded panel body with edge, rim, and central regions;
a plurality of penetrating holes through the central region spaced according to a uniform pattern; and
a plurality of blind holes in the edge region spaced according to and continuing the uniform pattern, each blind hole having a generally-decreasing non-penetrating depth proportional to its proximity to the rim region;
wherein the rim region is free of holes.

* * * * *